US012799324B2

(12) United States Patent
Hiratani et al.

(10) Patent No.: US 12,799,324 B2
(45) Date of Patent: Nov. 17, 2026

(54) POLYURETHANE ELASTOMER AND PRODUCTION METHOD THEREFOR

(71) Applicant: CANON KABUSHIKI KAISHA, Tokyo (JP)

(72) Inventors: Takayuki Hiratani, Tokyo (JP); Ryo Ogawa, Kanagawa (JP); Kana Sato, Shizuoka (JP); Masahiro Watanabe, Shizuoka (JP); Tetsuo Hino, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 454 days.

(21) Appl. No.: 18/487,225

(22) Filed: Oct. 16, 2023

(65) Prior Publication Data

US 2024/0043685 A1 Feb. 8, 2024

Related U.S. Application Data

(63) Continuation of application No. PCT/JP2022/016102, filed on Mar. 30, 2022.

(30) Foreign Application Priority Data

Apr. 26, 2021 (JP) ................................ 2021-074333
Jan. 28, 2022 (JP) ................................ 2022-011868
Mar. 18, 2022 (JP) ................................ 2022-043901

(51) Int. Cl.

| | |
|---|---|
| ***C08L 75/04*** | (2006.01) |
| ***C08G 18/10*** | (2006.01) |
| ***C08G 18/12*** | (2006.01) |
| ***C08G 18/20*** | (2006.01) |
| ***C08G 18/32*** | (2006.01) |
| ***C08G 18/40*** | (2006.01) |
| ***C08G 18/42*** | (2006.01) |
| ***C08G 18/44*** | (2006.01) |
| ***C08G 18/48*** | (2006.01) |
| ***C08G 18/76*** | (2006.01) |
| ***C08G 18/79*** | (2006.01) |

(52) U.S. Cl.

CPC .............. *C08L 75/04* (2013.01); *C08G 18/10* (2013.01); *C08G 18/12* (2013.01); *C08G 18/2027* (2013.01); *C08G 18/3206* (2013.01); *C08G 18/4018* (2013.01); *C08G 18/4238* (2013.01); *C08G 18/44* (2013.01); *C08G 18/4825* (2013.01); *C08G 18/4854* (2013.01); *C08G 18/7642* (2013.01); *C08G 18/7671* (2013.01); *C08G 18/792* (2013.01)

(58) Field of Classification Search

CPC ......... C08L 75/04; C08G 18/10; C08G 18/44; C08G 18/2027; C08G 18/3206; C08G 18/4018; C08G 18/4238; C08G 18/4854; C08G 18/7642; C08G 18/7671; C08G 18/4825; C08G 18/12; C08G 18/792

See application file for complete search history.

(56) References Cited

U.S. PATENT DOCUMENTS

| | | | |
|---|---|---|---|
| 7,141,183 | B2 | 11/2006 | Hattori et al. |
| 10,365,580 | B2 | 7/2019 | Kawamura et al. |
| 10,539,900 | B2 | 1/2020 | Horiuchi et al. |
| 11,840,597 | B2 | 12/2023 | Hiratani et al. |
| 2007/0088146 | A1 | 4/2007 | Nakamura et al. |
| 2018/0312623 | A1 | 11/2018 | Wang et al. |
| 2019/0367667 | A1 | 12/2019 | Aoki et al. |
| 2022/0073669 | A1 | 3/2022 | Hiratani et al. |
| 2023/0040808 | A1 | 2/2023 | Ogawa |

FOREIGN PATENT DOCUMENTS

| | | | |
|---|---|---|---|
| CN | 1961017 | A | 5/2007 |
| CN | 104558503 | B | 7/2017 |
| CN | 112251184 | A | 1/2021 |
| EP | 1 366 131 | B1 | 2/2006 |
| JP | 2000-29307 | A | 1/2000 |
| JP | 2004-51829 | A | 2/2004 |
| JP | 2012-103581 | A | 5/2012 |
| JP | 2013-163778 | A | 8/2013 |
| JP | 2017-116685 | A | 6/2017 |
| JP | 2017-191316 | A | 10/2017 |
| JP | 2018-41045 | A | 3/2018 |
| JP | 2019-65309 | A | 4/2019 |
| JP | 2020-90554 | A | 6/2020 |
| JP | 2020-128461 | A | 8/2020 |
| WO | 2018/155372 | A1 | 8/2018 |
| WO | 2022/230584 | A1 | 11/2022 |

OTHER PUBLICATIONS

JP 2004-51829, U.S. Pat. No. 7,141,183 B2.
JP 2017-191316, U.S. Pat. No. 10,365,580 B2.
JP 2017-116685, U.S. Pat. No. 10,539,900 B2.
WO 2018/155372, 2019/0367667 A1.
International Search Report in International Application No. PCT/JP2022/016102 (Jun. 2022).
International Preliminary Report on Patentability in International Application No. PCT/JP2022/016102 (Nov. 2023).
Extended European Search Report in European Application No. 22795500.2 (Apr. 2025).
Notice of Reasons for Refusal in Japanese Application No. 2022-043901 (Apr. 2026).
First Office Action in Chinese Application No. 202280031232.6 (Mar. 2026).

*Primary Examiner* — Rabon A Sergent
(74) *Attorney, Agent, or Firm* — VENABLE LLP

(57) ABSTRACT

Provided is a polyurethane elastomer having excellent friction properties (low friction coefficient), high wear resistance, and low hardness. The polyurethane elastomer includes: a first repeating structural unit represented by the general formula (1) and a second repeating structural unit represented by the general formula (2). The polyurethane elastomer includes a matrix phase and a domain phase dispersed in the matrix phase. The matrix phase includes the first repeating structural unit. The domain phase includes the second repeating structural unit.

8 Claims, 3 Drawing Sheets

32
33
31
(iii)
56
53
54
55
(i)
(ii)
● : HYDROXY GROUP
▲ : ISOCYANATE GROUP
◆ : URETHANE BOND
○ : ETHER BOND
51
52

POLYURETHANE ELASTOMER AND PRODUCTION METHOD THEREFOR

CROSS-REFERENCE TO RELATED APPLICATIONS

This application is a Continuation of International Patent Application No. PCT/JP2022/016102, filed Mar. 30, 2022, which claims the benefit of Japanese Patent Application No. 2021-074333, filed Apr. 26, 2021, Japanese Patent Application No. 2022-011868, filed Jan. 28 2022 and Japanese Patent Application No. 2022-043901, filed Mar. 18, 2022, all of which are hereby incorporated by reference herein in their entirety.

BACKGROUND

Technical Field

The present disclosure relates to a polyurethane elastomer and a method of producing the polyurethane elastomer.

Description of the Related Art

A polyurethane elastomer is used in a wide range of applications, such as artificial leather, synthetic leather, paint, a coating agent, and an adhesive. In general, the polyurethane elastomer is formed of a reacted product of a polyisocyanate and a polyol, and includes a hard segment derived from the polyisocyanate and a soft segment derived from the polyol. The polyol that is one of raw materials for the polyurethane elastomer is classified into a polyether polyol, a polyester polyol, a polycarbonate polyol, and the like depending on the difference in molecular chain structure, and the polyol is selected in accordance with the required performance. In particular, a polyurethane elastomer having a polycarbonate structure, of which a polycarbonate polyol is used as a raw material, is excellent in wear resistance. In addition, it has been known that the polyurethane elastomer having a polycarbonate structure is excellent also in heat resistance, weather resistance, hydrolysis resistance, and the like as compared to a polyurethane elastomer having a polyether structure or a polyester structure. Meanwhile, in the polyurethane elastomer having a polycarbonate structure, a strong intermolecular force acts between the polycarbonate structures to cause a significant increase in hardness of the polyurethane elastomer. Thus, it has been difficult to use the polyurethane elastomer having a polycarbonate structure in applications requiring low hardness.

In addition, a typical example of a low-hardness elastomer is a silicone elastomer. The silicone elastomer is superior in compression set but inferior in wear resistance to the polyurethane elastomer having a polycarbonate structure.

In this context, there is a demand for an elastomer having excellent wear resistance similar to that of the polyurethane elastomer having a polycarbonate structure, and low compression set comparable to that of the silicone elastomer.

In Japanese Patent Application Laid-Open No. 2020-128461, there is a disclosure of a polyurethane elastomer including a structural unit derived from a polyol, a structural unit derived from a polyether carbonate diol having a specific structure, and a structural unit derived from a polycarbonate diol having two repeating units with specific structures and/or a polyalkylene ether glycol having two repeating units with specific structures. In addition, in Japanese Patent Application Laid-Open No. 2000-29307, there is disclosure of a developing blade for an electrophotographic apparatus in which a blade member is bonded to a support. Further, there is a disclosure that a material for the blade member is a polyurethane elastomer that is a reacted product of a polyol compound and a polyisocyanate compound, and the polyol compound is a blend of polydimethylsiloxane having active hydrogen at least at each of both ends of its molecule, and polypropylene glycol.

According to the investigations made by the inventors, the polyurethane elastomer as disclosed in is excellent in flexibility as compared to related-art polycarbonate polyurethane, but it has been difficult to achieve low hardness comparable to that of the silicone elastomer. In addition, in the polyurethane elastomer as disclosed in Japanese Patent Application Laid-Open No. 2020-128461, it has been difficult to achieve excellent friction properties comparable to those of general polycarbonate polyurethane probably because a polyether segment is uniformly present in the polyurethane elastomer. In addition, the polyurethane elastomer as disclosed in Japanese Patent Application Laid-Open No. 2000-29307 is excellent in terms of hardness and friction properties, but it has been difficult to achieve low compression set comparable to that of the silicone elastomer.

The present disclosure is directed to providing a polyurethane elastomer having excellent friction properties (low friction coefficient), high wear resistance, and low hardness, and a method of producing the polyurethane elastomer.

SUMMARY

According to one aspect of the present disclosure, there is provided a polyurethane elastomer including: a first repeating structural unit represented by the general formula (1); and a second repeating structural unit represented by the general formula (2), wherein the polyurethane elastomer includes a matrix phase and a domain phase dispersed in the matrix phase, wherein the matrix phase includes the first repeating structural unit, and wherein the domain phase includes the second repeating structural unit:

General formula (1)

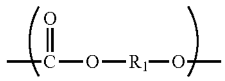

where $R_1$ represents an alkylene group having 3 to 12 carbon atoms;

General formula (2)

$$-(R_2-O)-$$

where $R_2$ represents an alkylene group having 3 to 6 carbon atoms.

According to another aspect of the present disclosure, there is provided a method of producing the above-mentioned polyurethane elastomer, the method including the steps of:

(i) allowing a first polyether having at least one isocyanate group and a first polycarbonate polyol having at least two hydroxy groups to react with each other to provide a urethane prepolymer having at least two hydroxy groups;

(ii) providing a dispersion in which a liquid droplet containing at least part of the urethane prepolymer is dispersed in a second polycarbonate polyol; and (iii) preparing a mixture for forming a polyurethane elastomer containing the dispersion and a polyisocyanate having at least two isocyanate groups, and then allowing the urethane prepolymer, the second polycarbonate polyol, and the polyisocyanate in the mixture for forming a polyurethane elastomer to react with each other to form the polyurethane elastomer.

Further features of the present disclosure will become apparent from the following description of exemplary embodiments with reference to the attached drawings.

DESCRIPTION OF THE EMBODIMENTS

Figure 1:
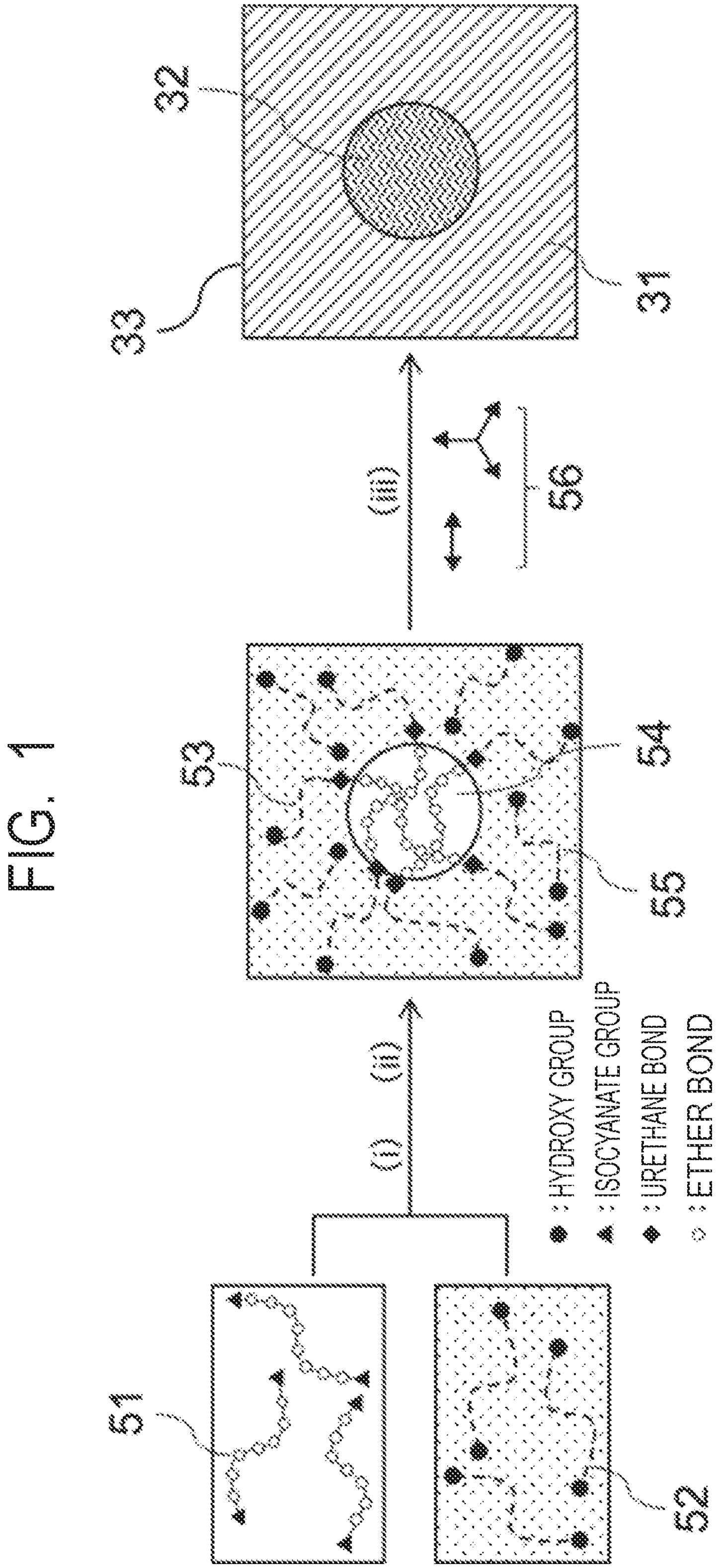
FIG. 1 is a schematic view for illustrating a method of producing a polyurethane elastomer according to the present disclosure.

Embodiments of the present disclosure are described below. The embodiments described below are merely examples, and the present disclosure is not limited to these embodiments.

The polyurethane elastomer according to the present disclosure includes, as repeating structural units, a first repeating structural unit having a polycarbonate structure represented by the general formula (1) and a second repeating structural unit having a polyether structure represented by the general formula (2):

General formula (1)

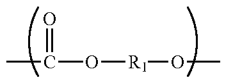

where $R_1$ represents an alkylene group having 3 to 12 carbon atoms;

General formula (2)

$$-(R_2-O)-$$

where $R_2$ represents an alkylene group having 3 to 6 carbon atoms.

In addition, the polyurethane elastomer includes a matrix phase and a domain phase dispersed in the matrix phase. The matrix phase includes a polyurethane including the first repeating structural unit. In addition, the domain phase includes the second repeating structural unit.

A polyurethane obtained by a reaction between a polyol having a polycarbonate structure (polycarbonate polyol) and a polyisocyanate has a strong intermolecular force between carbonate groups. Because of this, such polyurethane exhibits mechanical properties, such as excellent friction properties (low friction coefficient) and high wear resistance. However, the strong intermolecular force causes an increase in hardness, and hence such polyurethane is not suitable for use in a soft polyurethane elastomer application.

Meanwhile, in general, a polyurethane obtained by a reaction between a polyol having a polyether structure (polyether polyol) and a polyisocyanate has a weak intermolecular force between ether groups. Because of this, the hardness is suppressed to be significantly low, and hence such polyurethane is suitable for use in a soft polyurethane elastomer application. However, the weak intermolecular force causes decreases in mechanical properties, such as friction properties and wear resistance.

The polyurethane elastomer according to the present disclosure has a matrix-domain structure including a matrix phase and a domain phase. In addition, the matrix phase includes a polyurethane including the first repeating structural unit. In addition, the domain phase includes the second repeating structural unit. With such configuration, the polyurethane elastomer can have excellent friction properties and high wear resistance while having hardness suppressed to be low. That is, in the polyurethane elastomer according to the present disclosure, the functions of excellent friction properties and high wear resistance are imparted to the matrix phase, and the function of decreasing hardness is imparted to the domain phase. Through the impartment of different functions to the matrix phase and the domain phase, respectively, as described above, the polyurethane elastomer according to the present disclosure can achieve excellent friction properties, high wear resistance, and low hardness at higher levels.

Further, with such configuration as described above, the polyurethane elastomer according to the present disclosure can also achieve both low hardness and low compression set. The reason for this is conceived as described below. The matrix phase and the domain phase are chemically linked to each other through a urethane bond at an interface therebetween, and hence the polyurethane elastomer exhibits excellent elasticity (entropy elasticity) without plastic deformation against an external force such as compression. That is, it is conceived that the entire domain phase functions as a soft crosslinked point by virtue of the effect of entropy elasticity, and hence both the low hardness and the low compression set can be achieved.

In addition, it is preferable that, in a temperature-loss tangent (tan δ) curve obtained by dynamic mechanical analysis (DMA) of the polyurethane elastomer according to the present disclosure, at least two peaks attributed to glass transition observed in a temperature range of from −80 °C to +20 °C are present. It is more preferred that at least two peaks attributed to glass transition observed in a temperature range of from −70 °C to 0 °C be present. That is, the above-mentioned two cases indicate that a polyurethane segment having the above-mentioned polycarbonate structure and a polyurethane segment having the above-mentioned polyether structure are clearly phase-separated from each other through the interface between the matrix phase and the domain phase. When the peaks overlap with each other in the temperature-tan δ curve, it is required to separate the respective peaks. Here, the peak separation in the temperature-tan δ curve may be performed by a publicly known method.

Further, it is preferable that, in the temperature-tan δ curve obtained by the DMA of the polyurethane elastomer according to the present disclosure, at least one of the peaks attributed to glass transition is observed in a temperature range of −50 °C or less. It is also preferred that at least one of the peaks is in a temperature range of −40 °C or more. It is more preferred that at least one of the peaks be in a temperature range of −60 °C or less, and at least one of the peaks be in a temperature range of −35 °C or more. In general, the peak attributed to the glass transition of a polyether is observed in a temperature range of from −80 °C to −50 °C or less. In addition, the peak attributed to the glass transition of a polycarbonate is observed in a temperature range of from −40 °C to +20 °C or less. Thus, the presence of the peaks attributed to glass transition in the two temperature ranges means the following.

In the polyurethane elastomer according to the present disclosure, the segment including the first repeating structural unit and the segment including the second repeating structural unit are phase-separated. Then, the two segments are present while being hardly compatible with each other. Such clear phase separation suppresses the mixing of the segment including the second repeating structural unit into the matrix phase. Thus, in the polyurethane elastomer according to the present disclosure, the matrix phase achieves excellent friction properties and high wear resistance.

The first repeating structural unit having the polycarbonate structure represented by the general formula (1) included in the matrix phase in the polyurethane elastomer according to the present disclosure is described. $R_1$ in the general formula (1) represents an alkylene group having 3 to 12 carbon atoms. $R_1$ contains preferably an alkylene group having 3 to 9 carbon atoms, more preferably an alkylene group having 3 to 6 carbon atoms. When $R_1$ represents an alkylene group having 3 to 12 carbon atoms, low compatibility with the segment having the polyether structure represented by the general formula (2) is ensured, and the matrix phase and the domain phase can be clearly phase-separated. In addition, it is more preferred that $R_1$ contain an alkylene group having 3 to 12 carbon atoms from the viewpoint that the intermolecular force between the carbonate groups can be appropriately suppressed, and both the excellent friction properties and the high wear resistance and low hardness can be achieved. Examples of $R_1$ include $-(CH_2)_m-$ (m represents from 3 to 12), $-CH_2C(CH_3)_2CH_2-$, $-CH_2CH(CH_3)CH_2-$, and $-(CH_2)_2CH(CH_3)(CH_2)_2-$. In the polyurethane elastomer, all $R_1$s may be the same or different $R_1$s may be combined.

The number average molecular weight (Mn) of the polycarbonate structure represented by the general formula (1) is preferably 500 or more and 10,000 or less as the repeating unit in the polyurethane elastomer. The number average molecular weight is based on the polycarbonate polyol that is a raw material. The number average molecular weight is more preferably 700 or more and 8,000 or less. It is preferable that the number average molecular weight is 500 or more because the low compatibility with the polyurethane segment having the polyether structure of the repeating structural unit represented by the general formula (2) is ensured, and the phase separation between the matrix phase and the domain phase is made clear. In addition, an increase in viscosity of the polycarbonate polyol serving as a raw material can be suppressed by setting the number average molecular weight to 10,000 or less.

The number average molecular weights of a polyol and the like described later, as well as the number average molecular weight of the polycarbonate structure, are values calculated through use of standard polystyrene molecular weight conversion or a hydroxyl value (mgKOH/g) and a valence. For example, the number average molecular weight based on the polystyrene molecular weight conversion may be measured through use of high performance liquid chromatography. The number average molecular weight may be measured through use of, for example, two columns: Shodex GPCLF-804 (exclusion limit molecular weight: $2\times10^6$, separation range: 300 to $2\times10^6$) in series in a high-speed GPC device "HLC-8220GPC" manufactured by Tosoh Corporation. When the hydroxyl value and the valence are used, the number average molecular weight may be calculated by the following numerical expression. For example, the number average molecular weight of a polyol having a hydroxyl value of 56.1 mgKOH/g and a valence of 2 may be calculated to be 2,000.

$$\text{Number average molecular weight} = 56.1\times1{,}000\times\text{valence}/\text{hydroxyl value}$$

In the second repeating structural unit represented by the general formula (2) included in the domain phase, $R_2$ represents an alkylene group having 3 to 6 carbon atoms. $R_2$ contains preferably an alkylene group having a branched structure that has 3 to 5 carbon atoms, more preferably an alkylene group having a branched structure that has 3 or 4 carbon atoms. When $R_2$ represents an alkylene group having 3 to 6 carbon atoms, the low compatibility with the polyurethane segment having the polycarbonate structure represented by the general formula (1) is ensured, and the matrix phase and the domain phase may be clearly phase-separated. In addition, it is more preferred that $R_2$ contain an alkylene group having a branched structure that has 3 to 5 carbon atoms from the viewpoint that the intermolecular force between the ether groups can be suppressed to be significantly low, and the low hardness can be achieved. Examples of $R_2$ include $-(CH_2)_m-$(m represents from 3 to 6), $-CH_2CH(CH_3)-$, $-CH_2C(CH_3)_2CH_2-$, $-CH_2CH(CH_3)CH_2-$, $-(CH_2)_2CH(CH_3)CH_2-$, and $-(CH_2)_2CH(CH_3)(CH_2)_2-$. In the polyurethane elastomer, all $R_2$s may be the same or different $R_2$s may be combined.

The number average molecular weight (Mn) of the polyether structure represented by the general formula (2) is preferably 1,000 or more and 50,000 or less as the repeating unit in the polyurethane elastomer. The number average molecular weight is based on the polyether polyol that is a raw material. The number average molecular weight is more preferably 1,200 or more and 30,000 or less. When the number-average molecular weight is 1,000 or more, the low compatibility with the polyurethane segment having the polycarbonate structure represented by the general formula (1) is ensured, and the phase separation between the matrix phase and the domain phase can be made further clear. In addition, when the number average molecular weight is 50,000 or less, the segment having the polyether structure easily forms a domain phase, and the phase separation structure can be further stabilized.

The area ratio of the matrix phase to the domain phase in a cross-section of the polyurethane elastomer according to the present disclosure is preferably from 40/60 to 90/10, more preferably from 45/55 to 80/20. It is preferable that the area ratio of the matrix phase to the domain phase falls within the above-mentioned ranges because the phase separation form is stabilized, and the matrix phase and the domain phase tend to be easily formed stably.

The average diameter of the domain phase is preferably in a range of from 0.2 μm to 30 more preferably in a range of from 0.5 μm to 20 μm. It is preferable that the average diameter falls within the above-mentioned ranges because the low hardness is ensured when the average diameter is 0.2 μm or more, and the phase separation form is stabilized when the average diameter is 30 μm or less.

The area ratio of the matrix phase to the domain phase and the average diameter of the domain phase may be calculated by, for example, a publicly known method from a cross-section image of a polyurethane elastomer obtained with an optical microscope, a visco-elasticity atomic force microscope (Visco-Elasticity Atomic Force Microscopy, or VE-AFM), or a scanning electron microscope.

In addition, the chemical structures of components contained in the matrix phase and the domain phase may be analyzed with, for example, a spectroscopic analyzer, such as an AFM infrared spectroscopic analyzer, a microscopic infrared spectroscopic analyzer, or a microscopic Raman spectroscopic analyzer, or a mass spectrometer.

The polyurethane elastomer according to the present disclosure may be synthesized by, for example, a method including the following steps (i) to (iii):

Step (i): A step of allowing a first polyether having at least one isocyanate group and a first polycarbonate polyol having at least two hydroxy groups to react with each other to provide a urethane prepolymer having at least two hydroxy groups;

Step (ii): A step of providing a dispersion in which a liquid droplet containing at least part of the urethane prepolymer is dispersed in a second polycarbonate polyol; and Step (iii): A step of preparing a mixture for forming a polyurethane elastomer containing the dispersion and a polyisocyanate having at least two isocyanate groups, and then allowing the urethane prepolymer, the second polycarbonate polyol, and the polyisocyanate in the mixture for forming a polyurethane elastomer to react with each other to form the polyurethane elastomer.

One embodiment of a method of producing a polyurethane elastomer according to one aspect of the present disclosure is described with reference to FIG. 1. The method of producing a polyurethane elastomer according to the present disclosure is not limited to this embodiment.

In the step (i), a first polyether 51 having at least one isocyanate group and a first polycarbonate polyol 52 having at least two hydroxy groups are mixed. Next, the isocyanate group and the hydroxy group in the resultant mixture are allowed to react with each other in the presence of a curing catalyst to be linked to each other through a urethane bond, to thereby provide a urethane prepolymer 53 having at least two hydroxy groups. In FIG. 1, there is illustrated a polyether having two isocyanate groups as an example of the first polyether 51.

In the step (ii), the urethane prepolymer 53 obtained in the step (i) is dispersed in a second polycarbonate polyol 55. A segment derived from the first polyether 51 contained in the urethane prepolymer 53 forms a liquid droplet 54 without being compatible with the second polycarbonate polyol 55. Meanwhile, the liquid droplet 54 containing the segment derived from the first polyether forming part of the urethane prepolymer is uniformly and stably dispersed in the second polycarbonate polyol 55 through a segment derived from the first polycarbonate polyol 52 contained in the urethane polymer 53. As a result, a dispersion in which the liquid droplet 54 containing the segment derived from the first polyether 51 of the urethane prepolymer 53 is dispersed in the second polycarbonate polyol 55 is obtained. For the sake of description, the step (i) and the step (ii) are described separately, but these steps may be a continuous series of steps.

In the step (ii), the second polycarbonate polyol 55 in which the liquid droplet 54 is dispersed may be an unreacted product with the first polyether in the first polycarbonate polyol used in the step (i). That is, through use of an excess amount of the first polycarbonate polyol with respect to the first polyether in the step (i), a dispersion in which the urethane prepolymer 53 is dispersed in the excess first polycarbonate polyol, that is, the second polycarbonate polyol 55 described in the step (ii) can be obtained. Even when the first polycarbonate polyol 52 is used in an excess amount, a polycarbonate polyol (second polycarbonate polyol 55) serving as a dispersion medium for the urethane prepolymer may also be additionally added. In this case, the polycarbonate polyol to be added may have the same chemical composition as that of the first polycarbonate polyol used in the step (i) or may be different therefrom.

Meanwhile, when the first polycarbonate polyol 52 and the first polyether 51 are allowed to react with each other in equivalent amounts, and the entire first polycarbonate polyol 52 is consumed in the step (i), a new polycarbonate polyol is used as the second polycarbonate polyol to prepare a dispersion in the step (ii). Also in this case, the polycarbonate polyol used as the second polycarbonate polyol 55 may have the same chemical composition as that of the first polycarbonate polyol 52 or may be different therefrom.

Finally, in the step (iii), a mixture for forming a polyurethane elastomer containing the dispersion prepared in the step (ii) and a polyisocyanate 56 having at least two isocyanate groups is prepared. Then, the terminal hydroxy group of the urethane prepolymer 53, the hydroxy group of the second polycarbonate polyol 55, and the isocyanate group of the polyisocyanate 56 in the mixture for forming a polyurethane elastomer are allowed to react with each other. Thus, a network structure through a urethane bond is formed, and the mixture for forming a polyurethane elastomer is cured to provide a polyurethane elastomer according to the present disclosure. A polyurethane elastomer 33 thus obtained has a matrix-domain structure in which a domain 32 including a polyether structure derived from the first polyether 51, that is, a second repeating structural unit is dispersed in a matrix 31 including a polyurethane elastomer having a polycarbonate structure derived from the first polycarbonate polyol 52 and the second polycarbonate polyol 55, that is, a first repeating structural unit. In addition, the domain 32 mainly includes a polyether structure portion (second repeating structural unit), and the inside of the domain 32 may be substantially free of a crosslinked structure. In other words, the domain 32 may be present in the matrix 31 in a substantially liquid state. With this configuration, in the polyurethane elastomer 33 according to the present disclosure, the domain 32 can have a low elastic modulus.

Further, regarding the domain 32, a liquid portion is not simply confined in the matrix 31, but the domain 32 and the matrix 31 are chemically bonded to each other through a urethane bond in a boundary portion between the domain 32 and the matrix. Thus, the recovery from deformation of the domain 32 when the load applied to the polyurethane elastomer 33 is removed can be linked to the recovery from deformation of the matrix 31. That is, the domain 32 in a substantially liquid form is substantially free of a crosslinked structure therein. Thus, it is difficult for the domain 32, which is deformed by applying a load to the polyurethane elastomer 33, to recover from deformation autonomously. However, in the polyurethane elastomer 33 according to the present disclosure, the domain 32 is chemically bonded to the matrix 31 in a boundary portion with the matrix 31, and hence the domain 32 can also recover from deformation together with the deformation recovery of the matrix 31. As a result, stable deformation (deformation amount) and stable recovery from the deformation are achieved even when the polyurethane elastomer 33 is repeatedly subjected to loading and unloading.

The steps (i) and (ii) are steps of stably dispersing a polyether, which originally has low compatibility with a polyol and is difficult to disperse therein stably and uniformly, in the polyol. That is, the steps (i) and (ii) are steps of allowing the first polyether 51 and the first polycarbonate polyol 52 to react with each other to form the urethane prepolymer 53, thereby providing a dispersion in which the segment of the polyether derived from the first polyether 51 is stably and uniformly dispersed in the second polycarbonate polyol 55. As a result, the polyurethane elastomer 33 in which the domain 32 having high circularity, a small size of the micrometer order, and a relatively uniform size distribution is dispersed in the polyurethane 31 serving as the matrix can be produced.

As another method of mixing materials having low compatibility with each other, there is given, for example, a method of mixing and dispersing the materials with a high shearing force. However, in this method, as a result of the application of a high shearing force to the polyether, the shape of the domain gets distorted to decrease circularity, and the sizes of the domains may also become non-uniform. In addition, the dispersed state is also unstable, and the aggregation of the domains progresses in a relatively short period of time. In addition, the incompatibility between the polyether and the polycarbonate polyol is not ensured, and the phase separation between the matrix and the domain of the resultant polyurethane elastomer is made unclear. Thus, it is difficult to obtain such a polyurethane elastomer as to provide an elastic body that is flexible and is excellent in deformation recoverability according to the present disclosure.

The first polyether is a polyether having at least one isocyanate group and a repeating structural unit represented by the general formula (2). The first polyether may be obtained through, for example, the following steps.

A polyether polyol having at least two hydroxy groups and a repeating structural unit represented by the general formula (2) and a polyisocyanate having at least two isocyanate groups are allowed to react with each other.

Examples of the polyether polyol include: alkylene structure-containing polyether-based polyols, such as polypropylene glycol, polytetramethylene glycol, a copolymer of tetrahydrofuran and neopentyl glycol, and a copolymer of tetrahydrofuran and 3-methyltetrahydrofuran; and random or block copolymers of those polyalkylene glycols. Those polyether polyols may be used alone or in combination thereof Of the above-mentioned polyether polyols, an amorphous polyether polyol is preferred from the viewpoint that the low compatibility with the second polycarbonate polyol described later and low hardness can be achieved. Of the polyether polyols, at least one selected from polypropylene glycol, a copolymer of tetrahydrofuran and neopentyl glycol, and a copolymer of tetrahydrofuran and 3-methyltetrahydrofuran is more preferably incorporated.

The number average molecular weight of the polyether polyol is preferably 1,000 or more and 50,000 or less, more preferably 1,200 or more and 30,000 or less. It is preferable that the number average molecular weight is 1,000 or more because the low compatibility with the polycarbonate polyol is ensured, and the phase separation between the matrix phase and the domain phase of the resultant polyurethane elastomer is made clear. In addition, it is preferable that the number average molecular weight is 50,000 or less because the polyurethane segment derived from the polyether polyol tends to easily form the domain phase, and the phase separation form is stabilized.

Examples of the polyisocyanate to be allowed to react with the polyether polyol include pentamethylene diisocyanate, hexamethylene diisocyanate, isophorone diisocyanate, 2,4-tolylene diisocyanate, 2,6-tolylene diisocyanate, xylylene diisocyanate, diphenylmethane diisocyanate, a trimer compound (isocyanurate) or multimer compound of any of those polyisocyanates, an allophanate-type polyisocyanate, a biuret-type polyisocyanate, and a water-dispersion-type polyisocyanate. Those polyisocyanates may be used alone or in combination thereof.

Of the polyisocyanates exemplified above, a bifunctional isocyanate having two isocyanate groups is preferred because of high compatibility with the polyether polyol and the ease of adjustment of physical properties such as viscosity. Of the above-mentioned polyisocyanates, at least one selected from hexamethylene diisocyanate, isophorone diisocyanate, 2,4-tolylene diisocyanate, 2,6-tolylene diisocyanate, xylylene diisocyanate, and diphenylmethane diisocyanate is more preferably incorporated.

In the step of allowing the polyether polyol and the polyisocyanate to react with each other to provide the first polyether, an isocyanate index is preferably in a range of from 0.05 to 8.0, more preferably in a range of from 0.1 to 5.0. When the isocyanate index falls within the above-mentioned ranges, the amount of the component derived from the first polyether, which remains without forming a network structure, is reduced, and the exudation of a liquid substance from the polyurethane elastomer can be suppressed. The isocyanate index indicates a ratio ([NCO]/[OH]) of the number of moles of isocyanate groups in an isocyanate compound to the number of moles of hydroxy groups in a polyol compound.

The first polyether obtained by the reaction between the first polyether polyol and the polyisocyanate has a structure in which a hydroxy group and an isocyanate group are allowed to react with each other to be linked to each other through a urethane bond. The number average molecular weight thereof is preferably 1,000 or more and 100,000 or less, more preferably 1,200 or more and 50,000 or less.

The first polycarbonate polyol is a polycarbonate polyol having at least two hydroxy groups and a repeating structural unit represented by the general formula (1). Examples of the first polycarbonate polyol include a reacted product of a polyhydric alcohol and phosgene and a ring-opening polymerized product of a cyclic carbonate (e.g., an alkylene carbonate).

Examples of the polyhydric alcohol include propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, 2,4-diethyl-1,5-pentamethylenediol, glycerin, trimethylolpropane, trimethylolethane, cyclohexanediols (e.g., 1,4-cyclohexanediol), and sugar alcohols (e.g., xylitol and sorbitol).

Examples of the alkylene carbonate include trimethylene carbonate, tetramethylene carbonate, and hexamethylene carbonate.

The number average molecular weight of the first polycarbonate polyol is preferably 500 or more and 10,000 or less, more preferably 700 or more and 8,000 or less. It is preferable that the number average molecular weight is 500 or more because the low compatibility with the polyurethane segment having the polyether structure represented by the general formula (2) is ensured, and the phase separation between the matrix phase and the domain phase can be made further clear. In addition, it is preferable that the number average molecular weight is 10,000 or less because the handling can be prevented from becoming difficult due to an increase in viscosity of the polycarbonate polyol serving as a raw material.

The number average molecular weight of the first polycarbonate polyol may be calculated through use of a hydroxyl value (mgKOH/g) and a valence in the same manner as in the number average molecular weight of the polyether polyol.

The same polyisocyanates as those exemplified above as the raw material for the first polyether may each be used as the polyisocyanate 56 having at least two isocyanate groups to be used in the step (iii). Those polyisocyanates may be used alone or in combination thereof.

The first polyisocyanate preferably includes, of the polyisocyanates exemplified above, a polyisocyanate having at least three isocyanate groups, such as a trimer compound (isocyanurate) or multimer compound of a polyisocyanate, an allophanate-type polyisocyanate, or a biuret-type polyisocyanate, from the viewpoint that the elastic modulus of the matrix can be increased. The first polyisocyanate more preferably includes any one of a trimer compound (isocyanurate) of pentamethylene diisocyanate, a trimer compound (isocyanurate) of hexamethylene diisocyanate, and a multimer compound of diphenylmethane diisocyanate. The curing catalyst for the polyurethane elastomer is roughly classified into a urethanization catalyst (reaction accelerating catalyst) for accelerating rubberization (resinization) and foaming, and an isocyanuration catalyst (isocyanate trimerization catalyst). In the present disclosure, those polyisocyanates may be used alone or as a mixture thereof.

Examples of the urethanization catalyst include: tin-based urethanization catalysts, such as dibutyltin dilaurate and stannous octoate; and amine-based urethanization catalysts, such as triethylenediamine, tetramethylguanidine, pentamethyldiethylenetriamine, diethylimidazole, tetramethylpropanediamine, and N,N,N'-trimethylaminoethylethanolamine. Those urethanization catalysts may be used alone or as a mixture thereof.

Of those urethanization catalysts, triethylenediamine is preferred from the viewpoint of particularly accelerating the urethane reaction.

Examples of the isocyanuration catalyst include: metal oxides, such as $Li_2O$ and $(Bu_3Sn)_2O$; hydride compounds such as $NaBH_4$; alkoxide compounds, such as $NaOCH_3$, KO-(t-Bu), and a boric acid salt; amine compounds, such as $N(C_2H_5)_3$, $N(CH_3)_2CH_2C_2H_5$, and 1,4-ethylenepiperazine (DABCO); alkaline carboxylate salt compounds, such as HCOONa, $Na_2CO_3$, PhCOONa/DMF, $CH_3COOK$, $(CH_3COO)_2Ca$, alkali soap, and a naphthenic acid salt; alkaline formic acid salt compounds; and quaternary ammonium salt compounds such as $((R)_3—NR'OH)—OCOR''$. In addition, as a combination catalyst (cocatalyst) to be used as the isocyanuration catalyst, there are given, for example, an amine/epoxide, an amine/carboxylic acid, and an amine/alkyleneimide. Those isocyanuration catalysts and combination catalysts may be used alone or as a mixture thereof Of the catalysts for urethane synthesis, N,N,N'-trimethylaminoethylethanolamine (hereinafter referred to as "ETA"), which acts alone as a urethanization catalyst and also exhibits an action of an isocyanuration catalyst, is preferred.

A chain extender (polyfunctional low-molecular-weight polyol) may be used as required in a method of producing a polyurethane elastomer according to the present disclosure. The chain extender is, for example, a glycol having a number average molecular weight of 1,000 or less. Examples of the glycol include ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol), and triethylene glycol. In addition, the chain extender except the glycol is, for example, a polyhydric alcohol having a valence of 3 or more. Examples of the polyhydric alcohol having a valence of 3 or more include trimethylolpropane, glycerin, pentaerythritol, and sorbitol. Those alcohols may be used alone or as a mixture thereof.

In addition, additives, such as a conductive agent, a pigment, a plasticizer, a waterproof agent, an antioxidant, an ultraviolet absorber, and a light stabilizer, may also be used together as required.

EXAMPLES

Examples of the present disclosure are described below, but the present disclosure is not limited to these Examples.

Materials Used

Materials used in Examples and Comparative Examples are listed below.

Polyol

A-1: polyether diol (polypropylene glycol) [product name: PREMINOL S4013F, number of carbon atoms of $R_2$=3 (branched), Mn=12,000, hydroxyl value: 9.4 mgKOH/g, manufactured by AGC Inc.]

A-2: polyether diol (polypropylene glycol) [product name: UNIOL D-2000, number of carbon atoms of $R_2$=3 (branched), Mn=2,000, hydroxyl value: 55.0 mgKOH/g, manufactured by NOF Corporation]

A-3: polyether diol (copolymer of tetrahydrofuran and 3-methyltetrahydrofuran) [product name: PTG-L3000, number of carbon atoms of $R_2$=5 (branched)+4 (linear), Mn=2,900, hydroxyl value: 38.6 mgKOH/g, manufactured by Hodogaya Chemical Co., Ltd.]

A-4: polyether diol (polytetramethylene glycol) [product name: PTMG2000, number of carbon atoms of $R_2$=4 (linear), Mn=2,000, hydroxyl value: 57.2 mgKOH/g, manufactured by Mitsubishi Chemical Corporation]

A-5: polycarbonate diol [product name: Kuraray Polyol C-2090, number of carbon atoms of $R_1$=6 (linear)+6 (branched), Mn=2,000, manufactured by Kuraray Co., Ltd.]

A-6: polycarbonate diol [product name: Kuraray Polyol C-2065N, number of carbon atoms of $R_1$=9 (linear)+6 (branched), Mn=2,000, (hydroxyl value: 56.4 mgKOH/g, manufactured by Kuraray Co., Ltd.]

A-7: polycarbonate diol [product name: DURANOL T6002, number of carbon atoms of $R_1$6 (linear), Mn=1,900, hydroxyl value: 57.6 mgKOH/g, manufactured by Asahi Kasei Chemicals Corporation]

A-8 [product name: DURANOL G3452, Mn=$2.1\times10^3$ (hydroxyl value: 53.6 mgKOH/g), manufactured by Asahi Kasei Chemicals Corporation]

A-9: polyester diol [product name: Kuraray Polyol P-2050, Mn=1,900, hydroxyl value: 58.1 mgKOH/g, manufactured by Kuraray Co., Ltd.]

Polyisocyanate

B-1: xylylene diisocyanate [manufactured by Tokyo Chemical Industry Co., Ltd.]

B-2: Polymeric MDI [product name: MILLIONATE MR-200, manufactured by Tosoh Corporation]

B-3: isocyanurate compound [product name: STABiO D-370N, manufactured by Mitsui Chemicals, Inc.]

Curing Catalyst

C-1: 1,4-diazabicyclo[2.2.2]octane-2-methanol (product name; RZETA) [manufactured by Tosoh Corporation]

Chain Extender

D-1: 1,4-butanediol

Evaluation

Evaluation methods in Examples and Comparative Examples are as described below.

Evaluation 1: Appearance Inspection

In a polyurethane elastomer including a matrix phase and a domain phase, the transparency tends to be decreased due to the scattering of visible light, and hence a sample having a thickness of 2 mm was evaluated based on the following criteria.

Evaluation Criteria

Rank A: Opaque (object cannot be seen through the sample)

Rank B: Translucent (object can be seen through the sample, but the transparency is not high)

Rank C: Transparent (object can be clearly seen through the sample)

Evaluation 2: Tanδ Peak Temperature by Glass Transition

Measurement was performed with a viscoelasticity measuring device (product name: Physica MCR302, manufactured by Anton Paar Japan K.K.) as described below. A test piece having a thickness of 2 mm and a width of 5 mm formed with a punching cutter was set, and the viscoelasticity thereof was measured in a torsion mode (twisting) in a length of 20 mm at a temperature increase rate of 2 °C/min from −85 °C to 20 °C at a frequency of 1 Hz, to thereby provide a temperature-tan δ curve.

Evaluation 3: Microrubber Hardness

The microrubber hardness of a test piece having a thickness of 2 mm at 23 °C was measured with a microrubber hardness tester (product name: MD-1capa; manufactured by Kobunshi Keiki Co., Ltd., push needle: type A (cylindrical shape, diameter: 0.16 mm, height: 0.5 mm, outer diameter: 4 mm, inner diameter: 1.5 mm), measurement mode: peak hold mode). The microrubber hardness was evaluated based on the following criteria.

Evaluation Criteria

Rank A: Microrubber hardness of less than 40°

Rank B: Microrubber hardness of 40° or more and less than 50°

Rank C: Microrubber hardness of 50° or more

Evaluation 4: Friction Properties (Evaluation 4-1: Dynamic Friction Coefficient/Evaluation 4-2: Wear Resistance)

Evaluation was made with a ball-on-disk friction wear tester (product name: HEIDON Type: 20, manufactured by Shinto Scientific Co., Ltd.) as described below. A SUS ball indenter (diameter: 10 mm) was pressed against a test piece having a thickness of 2 mm fixed with a double-sided tape under a constant load, and rotated and slid. Thus, friction properties of the test piece having a thickness of 2 mm at a temperature of 23 °C were evaluated under the following measurement conditions.

Load: 0.5 N (50 g)

Rotation diameter: 1 cm

Rotation speed: 192 rpm (10 cm/sec)

Measurement time: 300 seconds

Evaluation 4-1>The dynamic friction coefficient was calculated as an average of measured values after 10 seconds to 300 seconds (sampling speed: 5 ms) from the start of measurement and evaluated based on the following criteria Evaluation Criteria Rank A: Dynamic friction coefficient of less than 1.6

Rank B: Dynamic friction coefficient of 1.6 or more and less than 2.4

Rank C: Dynamic friction coefficient of 2.4 or more

Evaluation 4-2>The wear resistance was evaluated from the results of visual observation of wear marks after the measurement of the dynamic friction coefficient based on the following criteria Evaluation Criteria Rank A: No wear marks can be recognized.

Rank B: Wear marks can be slightly recognized.

Rank C: Wear marks can be clearly recognized.

Evaluation 5: Elastic Deformation Power (ηiT)

The elastic deformation power (ηiT) at a temperature of 23 °C was adopted as an indicator for evaluating the compression set. The ηiT was measured with a nanoindenter (FISCHERSCOPE HM2000, manufactured by Fischer Instruments K.K.) through use of a square pyramid type Vickers indenter having a facing angle of 136° as an indenter under the following measurement conditions.

Maximum indentation load: 10 mN

Loading speed: 10 mN/30 sec

Maximum load holding time: 60 seconds

Unloading time: 5 seconds

The rηiT was calculated from the resultant "load-displacement curve" through use of the following formula.

$$\eta iT(\%)=(\text{elastic deformation work}/\text{total deformation work})\times 100$$

The compression set was evaluated from the resultant ηiT based on the following criteria.

Evaluation Criteria

Rank A: ηiT of 80% or more

Rank B: ηiT of 60% or more and less than 80%

Rank C: ηiT of less than 60%

Evaluation 6: Average Diameter of Domain Phase in Cross-Section of Polyurethane Elastomer and Area Ratio of Matrix Phase to Domain Phase The cross-section of the polyurethane elastomer was observed with a scanning probe microscope (SPM) (product name: S-Image, manufactured by Hitachi High-Tech Science Corporation) through use of a section having a thickness of about 800 nm produced through use of a cryomicrotome under the following conditions.

Measurement mode: VE-DFM (Viscoelastic Dynamic Force Mode)

Cantilever: SI-DF3 (spring constant=1.9 N/m)

Scanning area: 50 μm square

Operation frequency: from 0.3 Hz to 0.5 Hz

The average diameter of the domain phase and the area ratio of the matrix phase to the domain phase were determined by detecting a domain phase region with a grain analysis module through use of SPM image analysis software SPIP (Scanning Probe Image Processor, manufactured by Image Metrology).

Evaluation 7: Recognition and Analysis of Matrix Phase and Domain Phase in Cross-Section of Polyurethane Elastomer (Examples 1 to 12)

A section produced from a sheet-like polyurethane elastomer having a thickness of 2 mm through use of a microtome was subjected to mapping measurement with a three-dimensional microscopic laser Raman spectroscopic analyzer (product name: Nanofinder manufactured by Tokyo Instruments, Inc.). The measurement mode was EM, and 60×60 points were measured at intervals of 500 nm, to provide integrated images of from 0 $cm^{-1}$ to 400 $cm^{-1}$. From the resultant integrated images, the matrix phase and a plurality of domain phases dispersed in the matrix phase were recognized in the sheet. In addition, the matrix phase and the domain phase were clearly phase-separated.

Next, the Raman spectra of portions of the matrix phase and the domain phase were measured from the integrated images. The measurement was performed with a light source of Nd:YVO4 (wavelength: 532 nm), a laser intensity of 240 oW, an objective lens at a magnification of 100, a diffraction grating of 300 gr/mm, a pinhole diameter of 100 μm, an exposure time of 30 seconds, and a number of scans of 1. From the resultant Raman spectra, it was recognized that the matrix phase had a structure derived from the polycarbonate urethane and the domain phase had a structure derived from the polyether polyol.

Example 1

Preparation of Urethane Prepolymer UP1

31.9 Parts by mass of the polyol A-1, 1.0 part by mass of the polyisocyanate B-1, and 500 ppm of the curing catalyst C-1 were uniformly mixed, and the mixture was heated at a temperature of 100 °C for 24 hours to synthesize a polyol having an isocyanate group at an end thereof. 59.2 Parts by mass of the polyol A-5 was mixed into the polyol, and the mixture was heated at a temperature of 100 °C for 4 hours to produce a urethane prepolymer UP1.

Synthesis of Polyurethane Elastomer No. 1

92.1 Parts by mass of the urethane prepolymer UP1, 1.7 parts by mass of the B-1, 2.5 parts by mass of the B-2, and 3.7 parts by mass of the B-3 were mixed, and the mixture was stirred for 2 minutes with a rotation-revolution type vacuum stirring and defoaming mixer (product name: V-mini300, manufactured by EME Inc.) under the condition of a revolution speed of 1,600 rpm until the mixture became homogeneous. Thus, a mixture for forming a polyurethane elastomer according to this Example was obtained. Next, the mixture for forming a polyurethane elastomer was preheated to a temperature of 130 °C, poured into a mold having a release agent thinly applied thereto, for producing a sheet having a thickness of 2 mm, and cured by heating at a temperature of 130 °C for 2 hours. Next, the cured product was removed from the mold and post-cured at a temperature of 80 °C for 2 days to provide a sheet-like polyurethane elastomer No. 1 having a thickness of 2 mm.

Example 2

Preparation of Urethane Prepolymer UP2

13.5 Parts by mass of the polyol A-1, 26.9 parts by mass of the polyol A-2, 4.0 parts by mass of the polyisocyanate B-1, and 500 ppm of the curing catalyst C-1 were uniformly mixed, and the mixture was heated at a temperature of 100 °C for 24 hours to synthesize a polyol having an isocyanate group at an end thereof. 49.4 Parts by mass of the polyol A-5 was mixed into the polyol, and the mixture was heated at a temperature of 100 °C for 4 hours to produce a urethane prepolymer UP2.

Synthesis of Polyurethane Elastomer No. 2

93.8 Parts by mass of the urethane prepolymer UP2, 2.5 parts by mass of the B-2, and 3.7 parts by mass of the B-3 were mixed, and the mixture was stirred for 2 minutes with a rotation-revolution type vacuum stirring and defoaming mixer under the condition of a revolution speed of 1,600 rpm until the mixture became homogeneous. Thus, a mixture for forming a polyurethane elastomer was obtained. Then, a polyurethane elastomer No. 2 was obtained in the same manner as in Example 1 except that the mixture for forming a polyurethane elastomer was used.

Example 3

Preparation of Urethane Prepolymer UP3

35.6 Parts by mass of the polyol A-2, 4.9 parts by mass of the polyisocyanate B-1, and 500 ppm of the curing catalyst C-1 were uniformly mixed, and the mixture was heated at a temperature of 100 °C for 24 hours to synthesize a polyol having an isocyanate group at an end thereof. 53.3 Parts by mass of the polyol A-5 was mixed into the polyol, and the mixture was heated at a temperature of 100 °C for 4 hours to produce a urethane prepolymer UP3.

Synthesis of Polyurethane Elastomer No. 3

93.8 Parts by mass of the urethane prepolymer UP3, 2.5 parts by mass of the B-2, and 3.7 parts by mass of the B-3 were mixed, and the mixture was stirred for 2 minutes with a rotation-revolution type vacuum stirring and defoaming mixer under the condition of a revolution speed of 1,600 rpm until the mixture became homogeneous. Thus, a mixture for forming a polyurethane elastomer was obtained. Then, a polyurethane elastomer No. 3 was obtained in the same manner as in Example 1 except that the mixture for forming a polyurethane elastomer was used.

Example 4

Preparation of Urethane Prepolymer UP4

18.0 Parts by mass of the polyol A-1, 0.6 part by mass of the polyisocyanate B-1, and 500 ppm of the curing catalyst C-1 were uniformly mixed, and the mixture was heated at a temperature of 100 °C for 24 hours to synthesize a polyol having an isocyanate group at an end thereof. 72.1 Parts by mass of the polyol A-5 was mixed into the polyol, and the mixture was heated at a temperature of 100 °C for 4 hours to produce a urethane prepolymer UP4.

Synthesis of Polyurethane Elastomer No. 4

93.7 Parts by mass of the urethane prepolymer, 3.1 parts by mass of the B-1, 2.5 parts by mass of the B-2, and 3.7 parts by mass of the B-3 were mixed, and the mixture was stirred for 2 minutes with a rotation-revolution type vacuum stirring and defoaming mixer (product name: V-mini300, manufactured by EME Inc.) under the condition of a revolution speed of 1,600 rpm until the mixture became homogeneous. Thus, a mixture for forming a polyurethane elastomer was obtained. Then, a polyurethane elastomer No. 4 was obtained in the same manner as in Example 1 except that the mixture for forming a polyurethane elastomer was used.

Example 5

A urethane prepolymer UP5 was prepared in the same manner as in Example 1 except that the polyol A-6 was used instead of the polyol A-5. In addition, a polyurethane elastomer No. 5 was obtained in the same manner as in Example 1 except that the urethane prepolymer UP5 was used.

Example 6

A urethane prepolymer UP6 was prepared in the same manner as in Example 1 except that the polyol A-7 was used instead of the polyol A-5. In addition, a polyurethane elastomer No. 6 was obtained in the same manner as in Example 1 except that the urethane prepolymer UP6 was used.

Example 7

A urethane prepolymer UP7 was prepared in the same manner as in Example 1 except that the polyol A-8 was used instead of the polyol A-5. In addition, a polyurethane elastomer No. 7 was obtained in the same manner as in Example 1 except that the urethane prepolymer UP7 was used.

Example 8

Preparation of Urethane Prepolymer UP8

32.5 Parts by mass of the polyol A-1, 1.0 part by mass of the polyisocyanate B-1, and 500 ppm of the curing catalyst C-1 were uniformly mixed, and the mixture was heated at a temperature of 100 °C for 24 hours to synthesize a polyol having an isocyanate group at an end thereof. 56.8 Parts by mass of the polyol A-5 was mixed into the polyol, and the mixture was heated at a temperature of 100 °C for 4 hours to produce a urethane prepolymer UP8.

Synthesis of Polyurethane Elastomer No. 8

90.2 Parts by mass of the urethane prepolymer UP8 and 0.8 part by mass of the D-1 were mixed. Then, 2.8 parts by mass of the B-1, 2.5 parts by mass of the B-2, and 3.7 parts by mass of the B-3 were mixed, and the mixture was stirred for 2 minutes with a rotation-revolution type vacuum stirring and defoaming mixer (product name: V-mini300, manufactured by EME Inc.) under the condition of a revolution speed of 1,600 rpm until the mixture became homogeneous. Thus, a mixture for forming a polyurethane elastomer was obtained. Then, a polyurethane elastomer No. 8 was obtained in the same manner as in Example 1 except that the mixture for forming a polyurethane elastomer was used.

Example 9

Preparation of Urethane Prepolymer UP9

35.9 Parts by mass of the polyol A-3, 4.1 parts by mass of the polyisocyanate B-1, and 500 ppm of the curing catalyst C-1 were uniformly mixed, and the mixture was heated at a temperature of 100 °C for 4 hours to synthesize a polyol having an isocyanate group at an end thereof. 53.8 Parts by mass of the polyol A-5 was mixed into the polyol, and the mixture was heated and stirred at a temperature of 100 °C for 4 hours to prepare a urethane prepolymer UP9.

Synthesis of Polyurethane Elastomer No. 9

93.8 Parts by mass of the urethane prepolymer UP9, 2.5 parts by mass of the B-2, and 3.7 parts by mass of the B-3 were mixed, and the mixture was stirred for 2 minutes with a rotation-revolution type vacuum stirring and defoaming mixer under the condition of a revolution speed of 1,600 rpm until the mixture became homogeneous. Thus, a mixture for forming a polyurethane elastomer was obtained. Then, a polyurethane elastomer No. 9 was obtained in the same manner as in Example 1 except that the mixture for forming a polyurethane elastomer was used.

Example 10

Preparation of Urethane Prepolymer UP10

35.6 Parts by mass of the polyol A-4, 4.9 parts by mass of the polyisocyanate B-1, and 500 ppm of the curing catalyst C-1 were uniformly mixed, and the mixture was heated at a temperature of 100 °C for 4 hours to synthesize a polyol having an isocyanate group at an end thereof. 53.3 Parts by mass of the polyol A-5 was mixed into the polyol, and the mixture was heated at a temperature of 100 °C for 4 hours to produce a urethane prepolymer UP10.

Synthesis of Polyurethane Elastomer No. 10

93.8 Parts by mass of the urethane prepolymer UP10, 2.5 parts by mass of the B-2, and 3.7 parts by mass of the B-3 were mixed, and the mixture was stirred for 2 minutes with a rotation-revolution type vacuum stirring and defoaming mixer under the condition of a revolution speed of 1,600 rpm until the mixture became homogeneous. Thus, a mixture for forming a polyurethane elastomer was obtained. Then, a polyurethane elastomer No. 10 was obtained in the same manner as in Example 1 except that the mixture for forming a polyurethane elastomer was used.

Example 11

Preparation of Urethane Prepolymer UP11

31.9 Parts by mass of the polyol A-1, 0.3 part by mass of the polyisocyanate B-1, and 500 ppm of the curing catalyst C-1 were uniformly mixed, and the mixture was heated at a temperature of 100 °C for 24 hours to synthesize a polyol having an isocyanate group at an end thereof. 59.2 Parts by mass of the polyol A-5 was mixed into the polyol, and the mixture was heated at a temperature of 100 °C for 4 hours to produce a urethane prepolymer UP11.

Synthesis of Polyurethane Elastomer No. 11

92.1 Parts by mass of the urethane prepolymer UP11, 2.4 parts by mass of the B-1, 2.5 parts by mass of the B-2, and 3.7 parts by mass of the B-3 were mixed, and the mixture was stirred for 2 minutes with a rotation-revolution type vacuum stirring and defoaming mixer (product name: V-mini300, manufactured by EME Inc.) under the condition of a revolution speed of 1,600 rpm until the mixture became homogeneous. Thus, a mixture for forming a polyurethane elastomer was obtained. Then, a polyurethane elastomer No. 11 was obtained in the same manner as in Example 1 except that the mixture for forming a polyurethane elastomer was used.

Example 12

Preparation of Urethane Prepolymer UP12

31.9 Parts by mass of the polyol A-1, 1.5 parts by mass of the polyisocyanate B-1, and 500 ppm of the curing catalyst C-1 were uniformly mixed, and the mixture was heated at a temperature of 100 °C for 24 hours to synthesize a polyol having an isocyanate group at an end thereof. 59.2 Parts by mass of the polyol A-5 was mixed into the polyol, and the mixture was heated at a temperature of 100 °C for 4 hours to produce a urethane prepolymer UP12.

Synthesis of Polyurethane Elastomer No. 12

92.1 Parts by mass of the urethane prepolymer UP12, 1.2 parts by mass of the B-1, 2.5 parts by mass of the B-2, and 3.7 parts by mass of the B-3 were mixed, and the mixture was stirred for 2 minutes with a rotation-revolution type vacuum stirring and defoaming mixer (product name: V-mini300, manufactured by EME Inc.) under the condition of a revolution speed of 1,600 rpm until the mixture became homogeneous. Thus, a mixture for forming a polyurethane elastomer was obtained. Then, a polyurethane elastomer No. 12 was obtained in the same manner as in Example 1 except that the mixture for forming a polyurethane elastomer was used.

Comparative Example 1

87.7 Parts by mass of the polyol A-5, 4.5 parts by mass of the B-1, 3.1 parts by mass of the B-2, 4.7 parts by mass of the B-3, and 500 ppm of the curing catalyst C-1 were mixed, and the mixture was stirred for 2 minutes with a rotation-revolution type vacuum stirring and defoaming mixer under the condition of a revolution speed of 1,600 rpm until the mixture became homogeneous. Thus, a mixture for forming a polyurethane elastomer was obtained. Then, a polyurethane elastomer No. Cl was obtained in the same manner as in Example 1 except that the mixture for forming a polyurethane elastomer was used.

Comparative Example 2

35.1 Parts by mass of the polyol A-2, 52.6 parts by mass of the polyol A-9, 4.6 parts by mass of the B-1, 3.1 parts by mass of the B-2, 4.7 parts by mass of the B-3, and 500 ppm of the curing catalyst C-1 were mixed, and the mixture was stirred for 2 minutes with a rotation-revolution type vacuum stirring and defoaming mixer under the condition of a revolution speed of 1,600 rpm until the mixture became homogeneous. Thus, a mixture for forming a polyurethane elastomer was obtained. Then, a polyurethane elastomer No. C2 was obtained in the same manner as in Example 1 except that the mixture for forming a polyurethane elastomer was used.

The evaluation results of the polyurethane elastomers according to Examples 1 to 12 and Comparative Examples 1 and 2 are shown in Table 1-1 (Examples) and Table 1-2 (Comparative Examples).

TABLE 1-1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Evaluation 1 | Evaluation rank of appearance | A | A | B | A | A | A | A | A | B | B | A | A |
| Evaluation 2 | Tanδ peak temperature (° C.) (glass transition temperature) | −65/−22 | −57/−23 | −52/−25 | −65/−22 | −61/−34 | −64/−32 | −65/−8 | −63/−16 | −73/−25 | −69/−27 | −66/−22 | −64/−22 |
| Evaluation 3 | Evaluation rank of microrubber hardness (°) | 35 A | 29 A | 28 A | 42 B | 34 A | 42 B | 37 A | 36 A | 42 B | 44 B | 36 A | 34 B |
| Evaluation 4-1 | Evaluation rank of dynamic friction coefficient | 1.5 A | 1.9 B | 1.8 B | 1.5 A | 1.8 B | 1.7 B | 1.7 B | 1.5 A | 1.7 B | 1.9 B | 1.5 A | 1.5 A |

TABLE 1-1-continued

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Evaluation 4-2 | Evaluation rank of wear resistance | A | A | B | A | A | A | A | A | B | B | A | A |
| Evaluation 5 | Elastic deformation power (%) (compression set) | 83 A | 68 B | 61 B | 84 A | 82 A | 81 A | 86 A | 76 B | 66 B | 60 B | 86 A | 78 B |
| Evaluation 6 | Domain phase average particle diameter (μm) | 4.2 | 3.1 | 2.5 | 3.5 | 4.5 | 4.0 | 5.1 | 2.2 | 2.0 | 2.4 | 5.3 | 3.0 |
| Evaluation 6 | Domain phase area ratio (%) | 38 | 42 | 41 | 22 | 35 | 34 | 36 | 35 | 37 | 38 | 39 | 37 |
| Evaluation 7 | Recognition and analysis of matrix (M) and domain (D) | Clear phase separation between M and D M: Structure derived from polycarbonate urethane D: Structure derived from polyether polyol | Same as left | Same as left | Same as left | Same as left | Same as left | Same as left | Same as left | Same as left | Same as left | Same as left | Same as left |

TABLE 1-2

| | | Comparative Example | |
|---|---|---|---|
| | | 1 | 2 |
| Evaluation 1 | Evaluation rank of appearance | C | C |
| Evaluation 2 | Tanδ peak temperature (°C) (glass transition temperature) | −19 | −53 |
| Evaluation 3 | Evaluation rank of microrubber hardness (°) | 56 C | 26 A |
| Evaluation 4-1 | Evaluation rank of dynamic friction coefficient | 2.4 C | Unmeasurable |
| Evaluation 4-2 | Evaluation rank of wear resistance | A | C |
| Evaluation 5 | Elastic deformation power (%) (compression set) | 85 A | 71 B |
| Evaluation 6 | Domain phase average particle diameter (μm) | — | — |
| Evaluation 6 | Domain phase area ratio (%) | — | — |
| Evaluation 7 | Recognition and analysis of matrix (M) and domain (D) | Phase separation between M and D cannot be recognized. | Phase separation between M and D cannot be recognized. |

Structure of Polyurethane Elastomer

Figure 2:
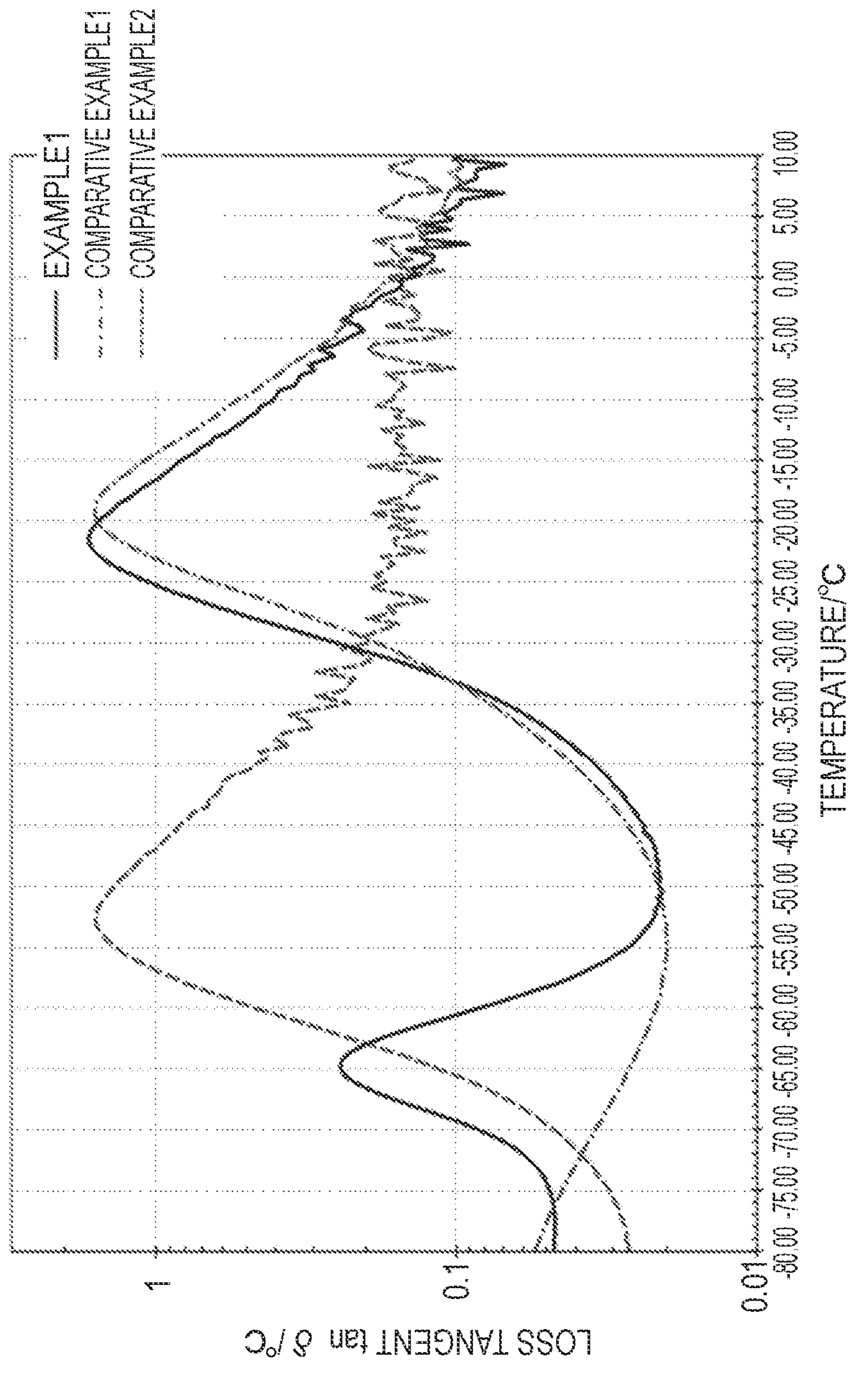
FIG. 2 is a graph for showing temperature-loss tangent (tan δ) curves obtained by dynamic mechanical analysis (DMA) of polyurethane elastomers produced in Example 1 and Comparative Examples 1 and 2.

Typical temperature-tan δ curves (Example 1, Comparative Examples 1 and 2) obtained by viscoelasticity measurement in the results shown in Tables 1-1 and 1-2 are shown in FIG. 2. As shown in FIG. 2, in Example 1, two tan δ peak temperatures (glass transition temperatures) were recognized in a range of from −80 °C to 10 °C, whereas in Comparative Examples 1 and 2, only one peak temperature was recognized. In addition, regarding the appearance of the polyurethane elastomer, the polyurethane elastomers No. 1 to No. 12 according to Examples 1 to 12 were opaque. Meanwhile, the polyurethane elastomers No. C1 and No. C2 according to Comparative Examples 1 and 2 had high transparency.

Figure 3:
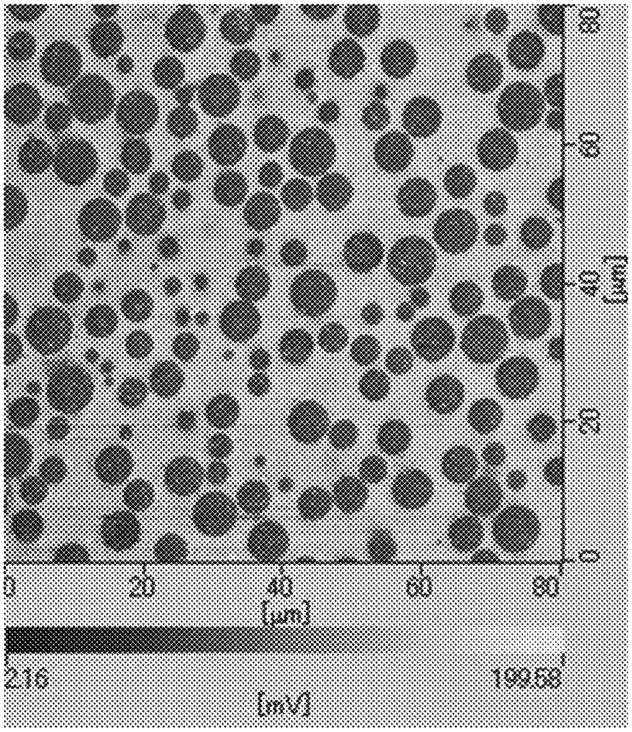
FIG. 3 is a photograph for showing a viscoelastic image of a cross-section of the polyurethane elastomer produced in Example 1 taken with a visco-elasticity atomic force microscope (VE-AFM).

The tan δ peak temperatures observed in the polyurethane elastomer No. 1 according to Example 1 were −65 °C and −22 °C, and were glass transition temperatures corresponding to the polyether polyurethane derived from the raw material A-1 (polypropylene glycol) and the polycarbonate polyurethane (see Comparative Example 1) derived from the raw material A-3 (polycarbonate polyol), respectively. That is, it was clarified that, in the polyurethane elastomer No. 1 obtained in Example 1, the polyurethane including a polycarbonate and the polyurethane including a polyether were hardly compatible with each other, and were present so as to be clearly phase-separated. In addition, a clear phase separation structure between the domain phase and the matrix phase was observed from the viscoelastic image of the cross-section of the polyurethane elastomer No. 1 shown in FIG. 3 taken with a visco-elasticity atomic force microscope (VE-AFM). In addition, it was shown that the domain phase having a high black density in the viscoelastic image was derived from the ether structure (general formula (2)) having low hardness in the polyurethane elastomer, and the matrix phase having a low black density was derived from the carbonate structure (general formula (1)) having high hardness in the polyurethane elastomer.

Also in the polyurethane elastomers No. 2 to No. 12 according to Examples 2 to 12, two peaks attributed to glass transition were observed in a temperature range of from −80 °C to +20 °C in the temperature-loss tangent (tan δ) curve obtained by dynamic mechanical analysis (DMA) in the same manner as in the polyurethane elastomer No. 1. In addition, a clear phase separation structure between the domain phase and the matrix phase was observed from the viscoelastic image of the cross-section of each of the polyurethane elastomers No. 2 to No. 12 taken with a viscoelasticity atomic force microscope (VE-AFM). In addition, it was shown that the domain phase having a high black density in the viscoelastic image was derived from the ether structure (general formula (2)) having low hardness in the polyurethane elastomer, and the matrix phase having a low black density was derived from the carbonate structure (general formula (1)) having high hardness in the polyurethane elastomer.

Meanwhile, in the polyurethane elastomer No. C2 obtained in Comparative Example 2, highly transparent appearance and cross-section observation results were obtained. Further, in addition to the foregoing, only one tan δ peak was observed at −53 °C, and hence it was recognized that the polyether polyurethane and the polyester polyurethane were substantially completely compatible with each other without having a phase separation structure.

Physical Properties of Polyurethane Elastomer

In the polyurethane elastomer No. 1 according to Example 1, the hardness was significantly reduced, and the reduction in dynamic friction coefficient was also observed, as compared to the single polycarbonate polyurethane No. C1 obtained in Comparative Example 1. In addition, the polyurethane elastomer obtained in Example 1 had excellent wear resistance and exhibited a high elastic deformation power (low compression set) comparable to that of the silicone elastomer.

Meanwhile, in the polyurethane elastomer No. C2 obtained in Comparative Example 2, the hardness was low, but the wear resistance was low. When the friction properties were evaluated, floating and bouncing of a ball indenter made of stainless steel (SUS304) occurred due to the surface roughness caused by wear, and hence it was difficult to measure a dynamic friction coefficient. In addition, as compared to Examples 1 and 2, the elastic deformation power was low, and the tendency of deterioration of compression set was observed.

From the above-mentioned results, it was clarified that the polyurethane elastomer according to the present disclosure exhibited an excellent effect capable of achieving low hardness, excellent friction properties, and low compression set. Those effects are determined to be caused by the presence of the phase separation structure in which the polycarbonate polyurethane is arranged in the matrix phase and the polyether polyurethane is arranged in the domain phase.

According to the present disclosure, polyurethane elastomer having excellent friction properties (low friction coefficient), high wear resistance, and low hardness, and a method of producing the same can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A polyurethane elastomer comprising:

a first repeating structural unit represented by formula (1); and a second repeating structural unit represented by formula (2), the polyurethane elastomer including a matrix phase and a domain phase dispersed in the matrix phase, the matrix phase including the first repeating structural unit, and the domain phase including the second repeating structural unit:

formula (1)

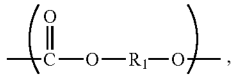

where $R_1$ represents an alkylene group having 3 to 12 carbon atoms;

formula (2)

$$-(R_2-O)-,$$

where $R_2$ represents an alkylene group having 3 to 6 carbon atoms, wherein, in a temperature-loss tangent (tan δ) curve obtained by dynamic mechanical analysis (DMA) of the polyurethane elastomer, at least two peaks attributed to glass transition observed in a temperature range of from −80 °C to +20 °C are present.

2. The polyurethane elastomer according to claim 1, wherein, of the peaks attributed to glass transition, at least one is observed in a temperature range of −50 °C or less, and at least one is observed in a temperature range of −40 °C or more.

3. The polyurethane elastomer according to claim 1, wherein, of the peaks attributed to glass transition, at least one is observed in a temperature range of −60 °C or less, and at least one is observed in a temperature range of −35 °C or more.

4. The polyurethane elastomer according to claim 1, wherein an area ratio of (the matrix phase/the domain phase) is from 40/60 to 90/10.

5. The polyurethane elastomer according to claim 1, wherein the domain phase has an average diameter in a range of from 0.2 μm to 30 μm.

6. The polyurethane elastomer according to claim 1, wherein $R_1$ in the first repeating structural unit represents an alkylene group having 3 to 9 carbon atoms.

7. The polyurethane elastomer according to claim 1, wherein $R_2$ in the second repeating structural unit represents an alkylene group having a branched structure that has 3 to 5 carbon atoms.

8. A method of producing a polyurethane elastomer, the method comprising the steps of:

(i) allowing a first polyether having at least one isocyanate group and a first polycarbonate polyol having at least two hydroxy groups to react with each other to provide a urethane prepolymer having at least two hydroxy groups;

(ii) providing a dispersion in which a liquid droplet containing at least part of the urethane prepolymer is dispersed in a second polycarbonate polyol; and (iii) preparing a mixture for forming a polyurethane elastomer, the mixture containing the dispersion and a polyisocyanate having at least two isocyanate groups, and then allowing the urethane prepolymer, the second polycarbonate polyol, and the polyisocyanate in the mixture for forming a polyurethane elastomer to react with each other to form the polyurethane elastomer, the polyurethane elastomer comprising:

a first repeating structural unit represented by formula (1); and a second repeating structural unit represented by formula (2), the polyurethane elastomer including a matrix phase and a domain phase dispersed in the matrix phase, the matrix phase including the first repeating structural unit, and the domain phase including the second repeating structural unit:

formula (1)

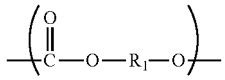

, where $R_1$ represents an alkylene group having 3 to 12 carbon atoms;

formula (2)

$$-(R_2-O)-,$$

where $R_2$ represents an alkylene group having 3 to 6 carbon atoms.

* * * * *